Figure 1:
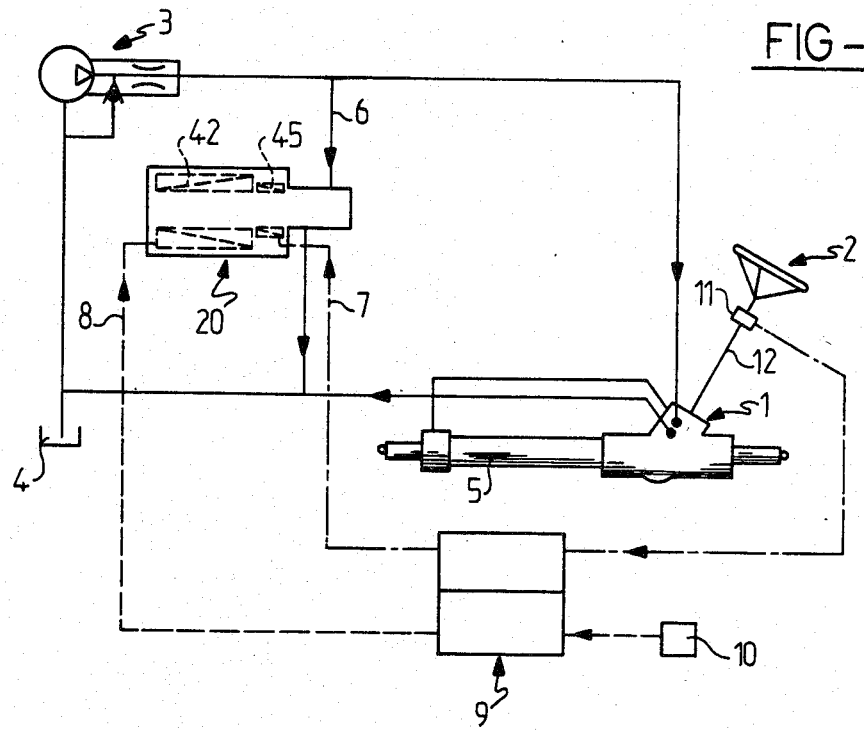

United States Patent [19]

Kervagoret

[11] Patent Number: 4,669,568

[45] Date of Patent: Jun. 2, 1987

[54] REGULATED DEVICE FOR CONTROLLING PRESSURE IN A HYDRAULIC INSTALLATION, PARTICULARLY FOR THE ASSISTED STEERING OF A VEHICLE

[75] Inventor: Gilbert Kervagoret, Argenteuil, France

[73] Assignee: Bendix France, Paris, France

[21] Appl. No.: 838,632

[22] Filed: Mar. 11, 1986

[30] Foreign Application Priority Data

Mar. 13, 1985 [FR] France ................. 85 03686

[51] Int. Cl.⁴ ............................................. B62D 5/08
[52] U.S. Cl. ..................................... 180/142; 91/459
[58] Field of Search ............. 180/142, 143, 141, 132; 91/459

[56] References Cited

FOREIGN PATENT DOCUMENTS

| | | | |
|---|---|---|---|
| 0089512 | 9/1983 | European Pat. Off. ............. | 180/142 |
| 2412337 | 10/1974 | Fed. Rep. of Germany ...... | 180/142 |
| 2207481 | 6/1974 | France .................................. | 180/142 |
| 2275715 | 1/1976 | France . | |

Primary Examiner—John A. Pekar
Attorney, Agent, or Firm—Larry J. Palguta; Ken C. Decker

[57] ABSTRACT

The device for controlling pressure (20) situated in a branch hydraulic line, comprises a distributor slide (23) which slides in a bore (22) into which an inlet passage (27) and an outlet passage (28) open, the slide forming with the outlet passage a restriction which can be modulated selectively, the slide having an internal passage (32, 30, 29) which is provided with a restriction (30) which establishes permanent communication between the inlet passage (27) and a pilot chamber (24), a passage (36, 37) communicates with the outlet passage (28) which opens into the pilot chamber (24) through a valve seat (35) which may be closed selectively by a valve member (38) which is controlled, as a function of electrical control signals, by an electromagnetic control component comprising typically a main coil (42) and a secondary coil (45) mounted on a non-magnetic support (39) which is firmly fixed to the valve member (38).

7 Claims, 2 Drawing Figures

REGULATED DEVICE FOR CONTROLLING PRESSURE IN A HYDRAULIC INSTALLATION, PARTICULARLY FOR THE ASSISTED STEERING OF A VEHICLE

The present invention relates to regulated devices for controlling pressure in a hydraulic installation, particularly for the assisted steering of a vehicle, comprising a source of pressure whose outlet is connected to a system for controlling a hydraulic actuator, the device being intended to be interposed in a branch hydraulic line between the outlet of the source and a reservoir, and including a body having a bore in which is slidingly mounted a modulating slide forming a modulable restriction between an inlet passage, which is intended to be connected to the outlet of the source of pressure, and an outlet passage, which is intended to be connected to the reservoir, the two passages opening into the bore, the position of the slide being determined by an electromagnetic control component as a function of at least one electrical control signal, typically, for the assisted steering of a vehicle, a signal which is a function of the speed of the said vehicle.

A regulated control device of this type is described in the document No. DE-A-2,412,337. In this known device, the modulating slide is coupled mechanically to a plunger of the electromagnetic control component whose position, which is a function of the electrical control signal, directly controls the position of the slide, in an arrangement which permanently requires an accurate and intense magnetic field to be exerted upon the plunger, having a poor response time and not protecting, particularly as regards fluctuations of the electrical control signal, from the risks of movement of the slide/plunger assembly subjecting the latter components to forces or indeed to shocks which are adverse and which are capable of rapidly affecting proper operation.

One object of the present invention is to propose a device of the above class, according to an arrangement which is simple, robust and reliable, which has a low operational inertia and offers a wide flexibility of use.

To achieve this, according to a feature of the invention, the slide has an internal passage, provided with a fixed restriction, which establishes permanent communication between the inlet passage and a pilot chamber which is formed in one end of the bore and which encloses a spring pushing the slide in the direction towards the other end of the bore, the device further incorporating, in the body, a passage which communicates with the outlet passage and which opens into the pilot chamber through a valve seat which may be selectively closed by a valve member controlled by the electromagnetic control component.

In such an arrangement, the modulating slide is piloted hydraulically by the valve member which is controlled by the electromagnetic control component the jerkfree operation, allowing rapid response times and a wide versatility as regards the control component.

Consequently, another object of the present invention is to propose a device of the type defined above, particularly for the assisted steering of a vehicle, allowing, in an arrangement which is simple, accurate, of low operational inertia and low manufacturing cost, control of the pressure delivered to the system for controlling the hydraulic actuator as a function of at least two different parameters, typically firstly, the speed of the vehicle, and secondly, the control torque exerted upon the steering wheel.

To achieve this, according to another feature of the invention, the valve member being fixed firmly to a plunger assembly which is actuated by a main coil of the electromagnetic control component which is supplied from a first electrical circuit, this plunger assembly comprises an annular support made of non-magnetic material which carries a secondary coil of light weight which supplied by a second electrical circuit.

Such an electrodynamic arrangement thus enables the pressure to be controlled effectively and with great accuracy as a function of parameters which change relatively slowly (vehicle speed) but also, concurrently, as a function of parameters which change very rapidly without hysteresis (steering torque).

Figure 2:
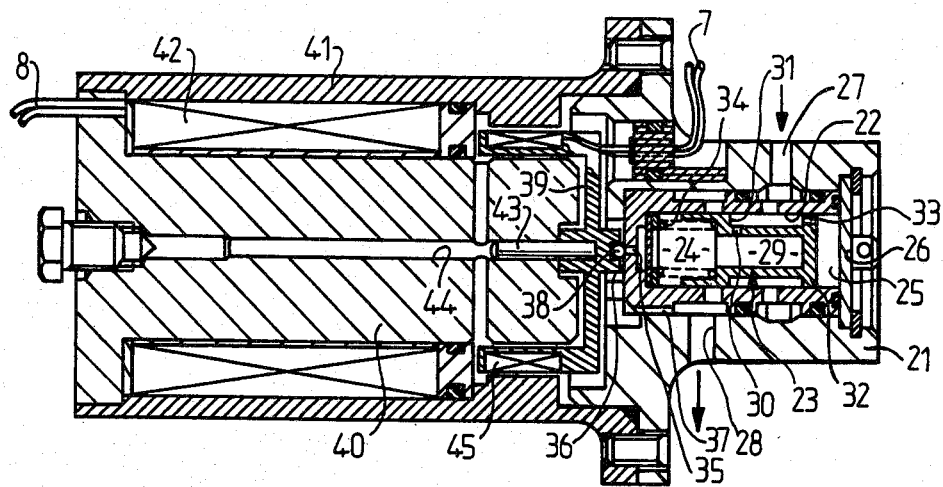

Other features and advantages of the present invention will appear from the following description of an embodiment which is given by way of illustration but is not limiting in any way, with reference to the accompanying drawings, in which:

FIG. 1 is a general diagram of a hydraulic installation for the assisted steering of a vehicle incorporating a regulated device for controlling pressure according to the invention; and FIG. 2 is a view in longitudinal section of a regulated device for controlling pressure according to the invention.

The diagram of FIG. 1 shows an assisted steering system for a vehicle which comprises, in a manner which is in itself known, a distribution servovalve 1 actuated by the steering wheel 2, which is interposed between a source of fluid under pressure 3, which is generally equipped with an integral flow regulating device, and a reservoir 4 so as to supply selectively and alternatively the opposing chambers of a hydraulic actuator 5 for assistance with steering with fluid under pressure. In accordance with the invention, a device 20 is interposed in a branch hydraulic line 6 between the outlet of the source of pressure 3 and the reservoir 4, the device 20 controlling the pressure supplied to the servovalve 1 as a function of at least one significant parameter supplied by one or more sensors, as will be described hereinbelow. More specifically, the pressure controlling device 20 according to the invention is designed to modulate the pressure supplied to the servovalve 1 as a function of two different electrical control signals 7 and 8 which are derived from an electronic control unit 9 as a function of signals supplied by two sensors, typically a vehicle speed sensor 10 and a sensor 11 which is arranged on the steering column 12 and which senses the steering torque exerted by the driver upon the steering wheel 2.

As shown clearly in FIG. 2, the regulated pressure controlling device 20 according to the invention comprises a body 21 having an internal bore 22 in which a distributor slide 23 is slidingly mounted; the distributor slide 23 separates the bore 22 into a blind rear chamber 24 and a front chamber 25 which is closed by a cover 26. In the body 21, are formed, offset longitudinally from one another, an inlet passage 27 which is intended to be connected to the portion of the branch hydraulic line 6 coming from the source of pressure 3, and an outlet passage 28 which is intended to be connected to the reservoir 4.

The slide 23 is formed internally with a longitudinal blind bore 29 which opens into the rear chamber 24 and communicates, via a fixed restriction 30, with an annular peripheral groove 31 which is defined on the side of the distributor slide 23 remote from the rear chamber 24 by a sliding collar 32 which is provided with a longitudinal passage of small cross-section 33 causing the groove 31 to communicate with the front chamber 25. Between the bottom of the rear chamber 24 and the distributor slide 23 is arranged a spring 34 which biases the distribution slide 23 towards the front chamber 25 so that communication between the outlet passage 28 and the peripheral groove 31 is normally interrupted, the axial dimension of the peripheral groove 31 being determined so that it is in permanent communication with the inlet passage 27. A through hole 35 is formed in the bottom of the chamber 24, this hole communicating, via a chamber 36 and a passage 37, with the outlet passage 28. The rear end of the hole 35 forms a seat for a valve member 38 which is biased so as to selectively close the hole 35. The valve member 38 is mounted on a plunger assembly which includes a cage-shaped annular support 39 arranged in the gap of an electromagnetic control component including a central pole piece 40 and an external pole piece 41 which are made of high permeability ferromagnetic material, and a coil 42 which is supplied with an electrical control current. The plunger assembly comprises a central guide rod 43 which is slidably mounted in a central bore 44 of the central pole piece 40. A coil 45 is arranged on the cylindrical portion of the cage 39, the coil 45 being of small mass and being adapted to be supplied with its own control current. The cage support 39 is made of non-magnetic material of high electrical resistivity and resistant to high temperatures, such as for example the commercial plastic available under the name NOMEX from the Dupont de Nemours company, or of Ferro-nickel alloy type 72CN18-10.

The device operates as follows: When the hole 35 is maintained closed, the slide 23, which is hydraulically balanced, occupies a position, under the effect of the spring 34, interrupting all communication towards the outlet passage 28. If, however, the valve member 38 opens, leakage occurs between the inlet passage 27 and the outlet passage 28 via the restriction 30, the chamber 24, the hole 35, the chamber 36 and the passage 37. This flow of fluid through the restriction 30 unbalances the slide 23 which then moves to the left (in the drawing) against the spring 34 so as to put the annular groove 31 directly into communication with the outlet passage 28 and to form a variable restriction defined by the equilibrium position which is newly adopted by the slide 23 and which is a function of the force exerted upon the valve component 38 so as to tend to hold it against its seat, this force being determined by the control currents of the coils 42 and 45.

According to a feature of the invention, as shown in the drawings, the main coil 42 receives the electrical signals 8 which are derived from the vehicle speed sensor 10, the variations of these electrical signals being relatively slow (of the order of several Hz). On the other hand, the movble coil 45 is controlled by the electrical signals 7 derived from the steering torque sensor 11, which may be of a potentiometric, inductive or strain gauge type, these electrical torque signals having in fact very rapid variations (of the order of 150 Hz) and without hysteresis. The polarizations of the control signals 7 and 8 are determined so that, typically, the pressure supplied to the steering servovalve 1 falls when the vehicle speed rises and when the steering torque falls.

Although the present invention has been described in relation to a particular form of embodiment, the invention is not limited by it but on the contrary is capable of modifications and variants which will be apparent to a person versed in the art.

What is claimed is:

1. A regulated device for controlling pressure in a hydraulic installation, particularly for assisted steering of a vehicle, comprising a source of pressure having an outlet connected to a system for controlling a hydraulic actuator, the device being intended to be interposed in a branch hydraulic line between the outlet of the source of pressure and a reservoir, and comprising a body having a bore in which is mounted slidingly a modulating slide forming a modulable restriction between an inlet passage intended to be connected to the outlet of the source of pressure and an outlet passage intended to be connected to the reservoir, said two passages opening into the bore, the slide comprising an internal passage having a fixed restriction which establishes permanent communication between the inlet passage and a pilot chamber formed in one end of the bore and which encloses a spring biasing the slide in a direction toward the other end of the bore, the device further comprising, in the body, a passage which communicates with the outlet passage and opens into the pilot chamber through a valve seat which may be closed selectively by a valve member controlled by an electromagnetic control component, positioning of the slide being determined by the electromagnetic control component which receives at least one electrical control signal and the spring and valve member.

2. The device according to claim 1, wherein the internal passage of the slide includes a longitudinal bore which communicates with a peripheral annular groove of the slide via said fixed restriction.

3. The device according to claim 2, wherein the slide has an end flange which defines said annular groove on one side and is formed with a passage of reduced cross-section establishing a communication between the groove and a blind chamber formed in the other end of the bore.

4. The device according to claim 1, wherein said valve member is fixed firmly to a plunger assembly which is actuated by a main coil of the electromagnetic control component and which is supplied from a first electrical circuit.

5. The device according to claim 4, wherein the plunger assembly comprises an annular support made of non-magnetic material which carries a secondary coil supplied from a second electrical circuit.

6. The device according to claim 5, wherein the first and second electrical circuits supply electrical signals to the respective coils as functions of different control parameters.

7. The device according to claim 6, wherein the first electrical circuit is connected to a unit which provides a signal which is a function of vehicle speed, and the second circuit connected to a unit which supplies a signal which is a function of steering torque of a steering wheel.

* * * * *